Feb. 3, 1925.

E. J. BREWSTER 1,524,908

VEHICLE SPRING CONSTRUCTION

Filed Jan. 22, 1924

INVENTOR.
E. J. Brewster
BY
ATTORNEY

Patented Feb. 3, 1925.

1,524,908

UNITED STATES PATENT OFFICE.

ETHELBERT J. BREWSTER, OF FRESNO, CALIFORNIA.

VEHICLE SPRING CONSTRUCTION.

Application filed January 22, 1924. Serial No. 687,710.

*To all whom it may concern:*

Be it known that I, ETHELBERT J. BREW-STER, a citizen of the United States, residing at Fresno, county of Fresno, State of California, have invented certain new and useful Improvements in Vehicle Spring Construction; and I do declare the following to be a full, clear, and exact description of the same, reference being had to the accompanying drawings, and to the characters of reference marked thereon, which form a part of this application.

This invention relates to improvements in leaf-springs such as are commonly used on motor vehicles, and particularly to an auxiliary spring means brought into action only with excessive depression of the mainsprings, due to overloads or heavy shocks, such means being adapted to be readily applied to any springs of the above named type, whether such springs are already installed on a vehicle or not.

The present invention also represents an improvement over the device shown in my United States Patent No. 1,287,858, on a vehicle spring, dated December 17th, 1918, my main object now being to provide a device of this character which I believe will be somewhat more efficient in operation, and easier to make and install as an attachment to springs already made, than was the previous device.

These objects I accomplish by means of such structure and relative arrangement of parts as will fully appear by a perusal of the following specification and claims.

In the drawings similar characters of reference indicate corresponding parts in the several views.

Figure 1:
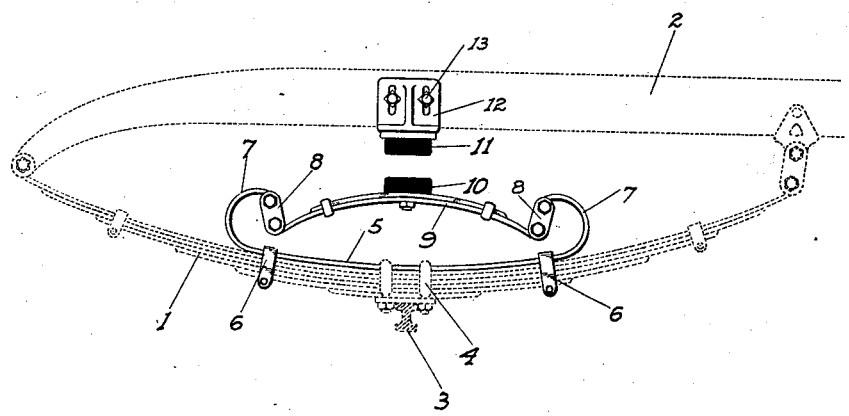
Fig. 1 is a side outline of an ordinary main leaf-spring, showing my improved shock absorbing structure mounted in connection therewith, the parts being under normal tension.
Figure 2:
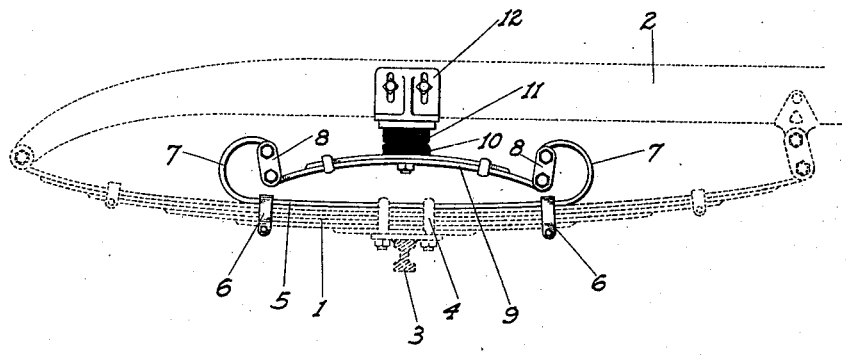
Fig. 2 is a similar view, showing the auxiliary spring means in action.

Referring now more particularly to the characters of reference on the drawings, the numeral 1 denotes a leaf spring of ordinary character, attached to the frame 2 of a vehicle in a conventional manner and attached centrally of its length to an axle 3 by means of the usual clips 4.

My improved auxiliary spring structure comprises a leaf 5, approximately one-third the length of the main spring, and located centrally on top thereof, being held from longitudinal movement by the clips 4. Additional clips or yokes 6 adjacent the ends of the leaf 5 and passing about said leaf and the leaves of the main spring thereunder, aid in holding said leaf 5 in proper position, while allowing it to flex in common with the leaves of the spring 1.

Beyond said clips 6 the leaf 5 is formed with opposed and substantially hook shaped or half-round ends 7 facing each other, and of considerable rigidity, although formed in common with the leaf 5.

Depending from and pivoted on the members 7 are shackles 8 of ordinary character, to the lower ends of which are pivoted the ends of a secondary leaf spring 9 extending between said shackles and having any predetermined number of leaves. This spring lies of course directly above the spring 1 and is in spaced relation thereto, with an oppositely disposed curvature.

A bumper-block 10 of hard rubber or similar material is mounted on top of the spring 9 centrally of the length thereof, and is in vertical alinement with but normally spaced from a similar block 11 mounted in a vertically slotted bracket 12, itself mounted on the frame 2 by means of bolts 13 therein passing through the bracket slots, so that vertical adjustment of the bracket relative to the frame and spring 9 may be had.

In operation, the mainspring 1 may have normal flexing without the secondary spring coming into action or being influenced in any way. The supporting leaf 5 of the secondary spring is however flexed, and adds to the strength of the mainspring and to its resistance to excessive flexion.

When the main spring is flexed from any cause to a point beyond its normal limits, the bumpers 10 and 11 become engaged, and the spring 9 becomes flexed, thereby of course taking some of the load off the mainspring and acting as a shock-absorbing cushion to prevent excessive movement of the mainspring.

By having the block supporting bracket 12 adjustable on the frame, the normal distance between the blocks 10 and 11 may be varied, thereby varying the extent the mainspring must flex before the secondary spring is brought into action. Also, a single size of bracket may be used on different makes of vehicle, irrespective of differences of spacing between the springs and frames.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. The combination with a vehicle frame and axle spaced apart, of a primary leaf spring secured at its center to the axle and at its ends to the frame, the top leaf of the spring having upwardly curving ends, a secondary leaf spring having a reverse curvature to the primary spring and shackled to such curved ends, and an element secured to the frame at a spaced distance from the secondary spring and adapted to engage and flex the latter when the primary spring has flexed to a certain degree.

2. The combination with a vehicle frame and axle spaced apart, of a primary leaf spring secured at its center to the axle and at its ends to the frame, the top leaf of the spring having upwardly curving ends, a secondary leaf spring having a reverse curvature to the primary spring and shackled to such curved ends, and an element secured to the frame at a spaced distance from the secondary spring and adapted to engage and flex the latter when the primary spring has flexed to a certain degree, such element being capable of being fixed at differently spaced positions from the secondary spring whereby the time of flexing of the secondary spring relative to the primary spring may be determined.

In testimony whereof I affix my signature.

ETHELBERT J. BREWSTER.